United States Patent Office 3,454,567
Patented July 8, 1969

3,454,567
OXAZINONE COMPOUNDS
Hein L. Klopping, Wilmington, and Harvey M. Loux, Hockessin, Del., assignors to E. I. du Pont de Nemours and Company, Wilmington, Del., a corporation of Delaware
No Drawing. Application Feb. 6, 1964, Ser. No. 343,112, now Patent No. 3,352,662, dated Nov. 14, 1967, which is a continuation-in-part of application Ser. No. 261,495, Feb. 27, 1963. Divided and this application May 10, 1967, Ser. No. 637,373
Int. Cl. C07d 87/08
U.S. Cl. 260—244                                21 Claims

ABSTRACT OF THE DISCLOSURE

Oxazinone compounds of the formula:

$$\begin{array}{c} NR_1 \\ \| \\ C \\ / \; \backslash \\ O \quad\;\; C-R_2 \\ | \quad\quad \| \\ O=C \quad C-R_3 \\ \backslash \;\; / \\ N \\ H \end{array}$$

and their salts, where $R_1$, $R_2$ and $R_3$ are as defined hereinafter are useful as herbicides and can also be converted into the corresponding uracils by contacting a halogenated oxazinone with a basic material to a pH above 7.

Exemplary of such compounds is 6-sec.-butylimino-5-chloro-3,6-dihydro-4-methyl-2H-1,3-oxazin-2-one hydrochloride.

CROSS-REFERENCE TO RELATED APPLICATIONS

This application is a divisional application of our copending application Ser. No. 343,112, filed Feb. 6, 1964, now U.S. Patent No. 3,352,662 which in turn was a continuation-in-part application of our then copending application Ser. No. 261,495 filed Feb. 27, 1963, now abandoned.

DESCRIPTION OF THE INVENTION

This invention relates to heterocyclic compounds and more particularly to such compounds having one oxygen atom and one nitrogen atom in the hetero-ring.

Many of the compounds of this invention are useful in providing control against undesired vegetation. Some of the compounds are effective weed killing agents at rates even as low as one-half pound per acre of treated area. Furthermore the compounds of this invention are valuable as intermediates in the preparation of a large variety of uracil derivative compounds which are themselves useful as herbicides.

According to this invention, we have discovered the following class of compounds which can be referred to as oxazinones:

(1)
$$\begin{array}{c} NR_1 \\ \| \\ C \\ / \; \backslash \\ O \quad\;\; C-R_3 \\ | \quad\quad \| \\ O=C \quad C-R_3 \\ \backslash \;\; / \\ N \\ H \end{array}$$

where $R_1$ is hydrogen, alkyl of 1 through 10 carbon atoms, substituted alkyl of 1 through 8 carbon atoms, aryl of 6 through 10 carbon atoms, substituted phenyl, aralkyl of 5 through 13 carbon atoms, substituted aralkyl of 5 through 13 carbon atoms, alkenyl of 3 through 8 carbon atoms, alkynyl of 3 through 8 carbon atoms, cycloalkyl of 3 through 12 carbon atoms, cycloalkenyl of 4 through 12 carbon atoms, cycloalkyl alkyl of 4 through 13 carbon atoms, cycloalkenyl alkyl of 5 through 13 carbon atoms, substituted cycloalkyl, substituted cycloalkenyl, (substituted cycloalkyl) alkyl of 4 through 14 carbon atoms, or (substituted cycloalkenyl) alkyl of 5 through 14 carbon atoms;

$R_2$ is hydrogen, chlorine, bromine, methyl, ethyl, n-propyl, isopropyl, n-butyl, sec-butyl, tert-butyl, methoxy, ethoxy, n-propoxy, isopropoxy, n-butoxy, sec-butoxy or tert-butoxy; and $R_3$ is alkyl of 1 through 5 carbon atoms, chloroalkyl of 1 through 4 carbon atoms, or bromoalkyl of 1 through 4 carbon atoms, and where $R_2$ and $R_3$ can be joined together to form —$(CH_2)_n$— where $n$ is a positive whole number from 3 through 5, i.e., 3, 4 or 5.

In the above, the term "substituted alkyl" is intended to include such radicals as Bromoalkyl of 1 through 8 carbon atoms,
Chloroalkyl of 1 through 8 carbon atoms,
Hydroxyalkyl of 1 through 8 carbon atoms,
Alkoxyalkyl of 2 through 8 carbon atoms,
Alkoxy carbonyl alkyl of 3 through 8 carbon atoms, and
Cyanoalkyl of 2 through 8 carbon atoms.

Similarly, the terms "aryl" and "substituted phenyl" embrace radicals such as

| | |
|---|---|
| Phenyl | Alkoxyphenyl |
| Naphthyl | Dibromophenyl |
| Biphenylyl | Dichlorophenyl |
| Chlorophenyl | Fluorophenyl |
| Bromophenyl | Trichlorophenyl |

Alkylphenyl of 7 through 11 carbon atoms
Dialkylphenyl of 8 through 12 carbon atoms
Chloroalkylphenyl of 7 through 10 carbon atoms
Nitrochlorophenyl
Nitrophenyl
Dichloronitrophenyl
Chloroalkoxyphenyl of 7 through 11 carbon atoms
Trifluoromethylphenyl
Tetrahydronaphthyl, and
Indenyl The terms "aralkyl" and "substituted aralkyl" are intended to include such radicals as Furfuryl
Benzyl
Phenylalkyl of 8 through 11 carbon atoms (total)
Chlorobenzyl
Dichlorobenzyl
Alkylbenzyl of 8 through 11 carbon atoms (total)
Dialkylbenzyl of 9 through 13 carbon atoms (total)
Nitrobenzyl
Alkoxybenzyl of 8 through 11 carbon atoms (total), and
Naphthylmethyl The terms "cycloalkyl," "cycloalkenyl," "cycloalkyl alkyl," and "cycloalkenyl alkyl" will include

| | |
|---|---|
| Cyclohexyl | Norbornylalkyl |
| Cyclohexenyl | Norbornenylalkyl |
| Cyclohexylalkyl | Bicyclo(2,2,2)octylalkyl |
| Cyclohexenylalkyl | Bicyclo(2,2,2)octenylalkyl |
| Cyclopentyl | Cyclopropyl |
| Cyclopentenyl | Cyclobutyl |
| Cyclopentylalkyl | Cyclobutylalkyl |
| Cyclopentenylalkyl | Cyclobutenyl |
| Norbornyl | Cyclobutenylalkyl |
| Norbornenyl | Hexahydroindanyl |

Tetrahydroindanyl
Hexahydroindenyl
Bicyclo(2,2,2)octyl
Bicyclo(2,2,2)octenyl

Hexahydroindenyl alkyl
Tetrahydroindanyl alkyl
Hexahydroindanyl alkyl

Hexahydro-4,7-methanoindenyl
Tetrahydro-4,7-methanoindanyl
Hexahydro-4,7-methanoindanyl
Hexahydro-4,7-methanoindenyl alkyl
Tetrahydro-4,7-methanoindanyl alkyl
Hexahydro-4,7-methanoindanyl alkyl
Decahydronaphthyl
Decahydronaphthyl alkyl
Tetrahydronaphthyl
Tetrahydronaphthyl alkyl
Decahydro-1,4-methanonaphthyl
Decahydro-1,4-methanonaphthyl alkyl
Octahydro-1,4-methanonaphthyl
Octahydro-1,4-methanonaphthyl alkyl
Decahydro-1,4-5,8-dimethanonaphthyl
Decahydro-1,4-5,8-dimethanonaphthyl alkyl
Octahydro-1,4-5,8-dimethanonaphthyl, and
Octahydro-1,4-5,8-dimethanonaphthyl alkyl These cyclic substituents can be further substituted with alkyl groups of 1 through 4 carbon atoms, methoxy, chlorine and bromine.

The compounds of Formula 1 can conveniently be prepared in the form of salts with organic or inorganic acids. The free base is highly unstable and the salts are therefore highly preferred. Some examples of these preferred salts are the salts of such acids as hydrochloric acid, hydrobromic acid, hydroiodic acid, sulfuric acid, sulfamic acid, benzoic acid, acetic acid, phosphoric acid, phthalic acid, citric acid, succinic acid, maleic acid, tartaric acid, propionic acid, dichloroacetic acid, trichloroacetic acid, alpha,-alpha-dichloropropionic acid, and the like.

In accordance with our invention, compounds of Formula 1 above can be prepared in a simple but remarkable two-step process, as follows:

*Step 1.*—React a substituted acetoacetamide with ammonia to form a substituted beta-aminocrotonamide.

*Step 2.*—React the beta-aminocrotonamide with phosgene to form the corresponding oxazin-2-one hydrochloride salt.

The process proceeds according to the following equations:

*Step 1:*

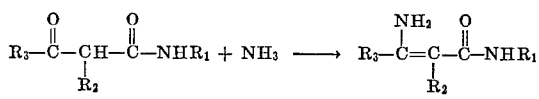

*Step 2:*

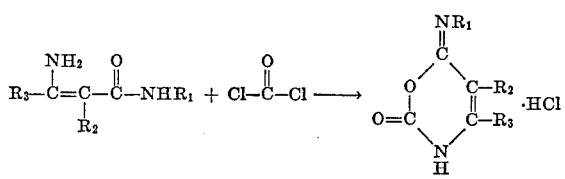

where $R_1$, $R_2$ and $R_3$ have the same meaning as in Formula 1.

The acetoacetamides used in Step 1 are prepared either by reaction of an amine with diketene as described below or by reaction of a beta-keto ester with excess amine followed by treatment with aqueous acid.

We shall now describe a preferred exemplary procedure, where $R_2$ is hydrogen and $R_3$ is methyl.

The acetoacetamide used as the starting material can be prepared by reacting diketene with an amine according to the equation:

This procedure is described in greater detail in U.S. Patent No. 2,615,917.

The acetoacetamide is then reacted with ammonia. This reaction is carried out by admixing the ammonia with a solution of the acetoacetamide in water or an inert organic solvent such as ether, tetrahydrofuran, an alcohol, 1,1,2-trichloroethylene, or the like. If water is used as the solvent, the ammonia can conveniently be added as an aqueous solution. For example, concentrated aqueous ammonia on the order of 28–30% by weight ammonia can be used as it. If an inert organic solvent is used, the ammonia can be introduced as a gas or as an undiluted liquid. The reaction mass is stirred if desired to promote good mixing of the reactants.

The mol ratio of ammonia to acetoacetamide should be at least 1 to 1. The upper limit of ammonia is largely determined by convenience and economics but no reason is seen to exceed an ammonia to acetoacetamide mol ratio of 50 to 1 and a ratio of below 10 to 1 is preferred. The use of an excess of ammonia results in an increased yield of beta-aminocrotonamide.

The temperature at which the amination of the acetoacetamide is carried out is largely a matter of convenience. Ordinarily at ambient pressure temperatures above about 50° C. are disadvantageous because of undesired loss of ammonia above this temperature. The reaction temperature is preferably in the range from minus 30° to 30° C.

The amination reaction generally takes from about 1 to 10 hours, depending as will be understood upon the reaction temperature and the system employed.

The beta-aminocrotonamide product is recovered by any convenient physical means, such as by filtration, separation of layers, evaporation of the solvent, or the like. After recovery, the beta-aminocrotonamide product can be dried and used directly in Step 2 of our process or can, if desired, be purified by customary methods such as recrystallization.

The beta-aminocrotonamide prepared according to Step 1 is converted into the corresponding substituted oxazin-2-one hydrochloride by reaction of the former with phosgene. The preparation of a 6-imino-3,6-dihydro-4-methyl-2H-1,3-oxazin-2-one hydrochloride from a beta-aminocrotonamide and phosgene will now be described for purposes of illustration.

A solution of phosgene is prepared in a suitable inert organic solvent such as tetrahydrofuran, dioxane, acetonitrile, 1,1,2-trichloroethylene, or the like. A solvent solution or slurry of the beta-aminocrotonamide, preferably in the same solvent as the phosgene, is admixed with the phosgene solution.

Equimolar amounts of beta-aminocrotonamide and phogene can be used but for improved efficiency and economy a slight excess of phosgene is preferred. Ordinarily the amount of phosgene used will not exceed 5 mols and preferably will not exceed 2 mols for each mol of beta-aminocrotonamide. It is advantageous to add the crotonamide solution or slurry to the phosgene solution and maintain phosgene addition to keep the phosgene in excess and the solution saturated with phosgene. Superatmospheric pressure can be used to advantage.

This reaction is highly exothermic and a large amount of heat is evolved during the admixture of the beta-aminocrotonamide and the phosgene. It is desirable to carry out the admixing at moderate temperatures, say at about 25° to 50° C., in order to minimize vaporization of the phosgene. External cooling means such as a refrigerated condenser can be used if needed to hold the temperature within this range.

Upon completion of the admixture of the beta-aminocrotonamide and the phosgene, the mixture which now contains a solid as a second phase is heated at a temperature from about 40° to about 100° C. for a period of from about 30 minutes to about 6 hours to complete the reaction. As a result of the reaction, the desired hydrochloride salt of the 6-imino-3,6-dihydro-4-methyl-2H-1,3-oxazin-2-one is formed. This compound can be recovered by any convenient means such as filtration or decantation of the supernatant liquid.

The hydrochloride salt can be converted to other salts of the oxazinone by conventional replacement reactions or by neutralization of the hydrochloride, for example by the use of silver oxide suspended in an inert solvent such as methylene chloride, followed by the filtration of the silver chloride and addition of the acid required for the desired salt. Salts of acids weaker than hydrochloric acid can be prepared by suspending or dissolving the oxazinone hydrochloride in an inert solvent (or simply in the weaker acid if it is a liquid), adding the appropriate amount of the weaker acid and a salt of the weaker acid, e.g. the sodium salt, and filtering off or otherwise removing the sodium chloride formed.

Those oxazinone salts where $R_2$ is chlorine or bromine are prepared by conventional halogenation procedures, for example by reaction with the halogen in glacial acetic acid or other solvent.

The oxazinone salts in general do not have distinct melting points. On heating they lose hydrogen chloride and convert to the corresponding uracil as will be described in greater detail hereinafter.

The oxazinone salts are soluble in water and somewhat soluble in highly polar organic solvents such as acetic acid and alcohols but are insoluble in the less polar organic solvents.

The oxazinone salts exhibit distinctive infrared absorption. Characteristic features are (a) the lack of absorption at the N–H stretching frequency, (b) an intense absorption at 1770–1810 cm. which can be attributed to the

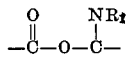

moiety of the structure of Formula 1 above, (c) multiple absorption in the range of 1570 to 1660 cm.$^{-1}$, probably due to absorption by $>C=C<$, $>C=N-$ and $>C=O$, and (d) absorption of medium intensity at 1510–1515 cm.$^{-1}$ which is characteristic of monosubstituted amides. Nuclear magnetic resonance and ultraviolet studies are consistent with the assigned oxazinone ring system.

Three tautomeric structures for the compounds are indicated from the above information as follows:

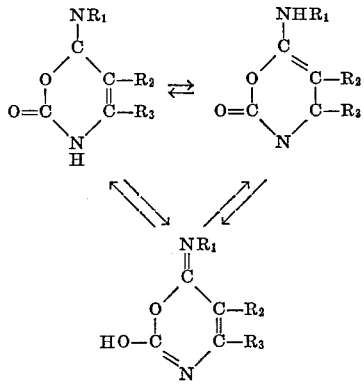

As mentioned above, many of the compounds of this invention exhibit herbicidal activity. Because of their outstanding usefulness as general purpose herbicides against both broadleaf and grass weeds, salts of compounds of Formula 1 are preferred where $R_1$ is other than hydrogen.

Particularly preferred for their herbicidal effectiveness are salts of compounds of the following formula:

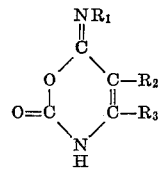

where $R_1$ is alkyl of 1 through 10 carbon atoms, substituted alkyl of 1 through 8 carbon atoms, aryl of 6 through 10 carbon atoms, substituted phenyl, aralkyl of 5 through 13 carbon atoms, substituted aralkyl of 5 through 13 carbon atoms, alkenyl of 3 through 8 carbon atoms, alkynyl of 3 through 8 carbon atoms, cycloalkyl of 3 through 12 carbon atoms, cycloalkenyl of 4 through 12 carbon atoms, cycloalkyl alkyl of 4 through 13 carbon atoms, cycloalkenyl alkyl of 5 through 13 carbon atoms, substituted cycloalkyl, substituted cycloalkenyl, (substituted cycloalkyl) alkyl of 4 through 14 carbon atoms, or (substituted cycloalkenyl) alkyl of 5 through 14 carbon atoms;

$R_2$ is hydrogen, chlorine or bromine;

$R_3$ is methyl; and where $R_2$ and $R_3$ can be joined together to form $-(CH_2)_n-$ where $n$ is 3, 4 or 5 and provided that, when $R_2$ is hydrogen and $R_3$ is methyl, $R_1$ is other than methyl or ethyl.

Illustrative of preferred compounds of this invention are salts and particularly the hydrochlorides or hydrobromides of the following oxazinones:

6-sec-butylimino-5-chloro-3,6-dihydro-4-methyl-2H-1,3-oxazin-2-one
6-sec-butylimino-5-bromo-3,6-dihydro-4-methyl-2H-1,3-oxazin-2-one
6-norbornylimino-3,6-dihydro-4-methyl-2H-1,3-oxazin-2-one
6-norbornylmethylimino-5-bromo-3,6-dihydro-4-methyl-2H-1,3-oxazin-2-one
6-(1-ethylpropylimino)-5-bromo-3,6-dihydro-4-methyl-2H-1,3-oxazin-2-one
6-(1,3-dimethylbutylimino)-5-chloro-3,6-dihydro-4-methyl-2H-1,3-oxazin-2-one
6-isopropylimino-5-bromo-3,6-dihydro-4-methyl-2H-1,3-oxazin-2-one
6-tert-butylimino-5-bromo-3,6-dihydro-4-methyl-2H-1,3-oxazin-2-one
6-phenylimino-5-bromo-3,6-dihydro-4-methyl-2H-1,3-oxazin-2-one
6-(3a,4,7,7a-tetrahydro-4,7-methanoindan-2-ylimino)-3,6-dihydro-4-methyl-2H-1,3-oxazin-2-one
6-cyclohexylimino-5-bromo-3,6-dihydro-4-methyl-2H-1,3-oxazin-2-one
6-cyclohexylimino-4,5-trimethylene-3,6-dihydro-2H-1,3-oxazin-2-one Preparation of compounds of this invention is illustrated by the following specific examples, which are given for purposes of explanation and not limitation and in which parts and percentages are by weight unless otherwise indicated.

Example 1.—6-sec-butylimino-3,6-dihydro-4-methyl-2H-1,3-oxazin-2-one hydrochloride To 852 parts of N-sec-butylacetoacetamide are added 540 parts (70% excess) of concentrated (29%) aqueous ammonia. The clear solution is stirred and kept about room temperature in order to avoid an excessive loss of ammonia. After about 6 minutes, the solution turns cloudy and an oil begins to separate soon thereafter. Crystallization is induced by scratching the vessel wall. Precipitation of the product beta-amino-N-sec-butylcrotonamide is complete in 4 hours. The thick crystal mass is filtered and the solid is washed with ice water and dried in a vacuum oven at 55–60° C. The product is weighed and found to be 696 parts (82% of theory) and melts at 84–88° C. Recrystallization from benzene raises the melting point to 89–90° C.

*Analysis.*—Calculated for $C_8H_{16}N_2O$: N, 17.9. Found: N, 17.7.

To a solution of 22 parts of phosgene in 100 parts of tetrahydrofuran is added dropwise with stirring a solution of 31.2 parts of beta-amino-N-sec-butylcrotonamide in 75 parts of tetrahydrofuran. A solid precipitates and the temperature rises to 45° C. The mixture is stirred and refluxed for a period of 2 hours, cooled and filtered to obtain 27 parts of 6-sec-butylimino-3,6-dihydro-4-methyl-2H-1,3-oxazin-2-one hydrochloride melting at 151.5–162.5° C. with gas evolution.

*Analysis.*—Calculated for $C_9H_{15}ClN_2O_2$: N, 13.2. Found: N, 12.8.

The infrared spectrum of this material is characterized by a sharp peak at 5.6 microns ascribable to the

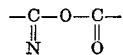

moiety, a peak at 3.7 microns (amine hydrochloride) and the absence of NH absorption in the 3 micron region.

The solid is soluble in water to the extent of about 27% by weight at room temperature. On prolonged standing of the aqueous solution at room temperature, or much more rapidly on heating, $CO_2$ evolves, and from the solution can now be isolated ammonium chloride and N-sec-butyl acetamide.

Upon dry heating above the melting point until gas evolution ceases, followed by cooling, a solid is formed which does not depress the melting point of 3-sec-butyl-6-methyluracil (M.P. 118–120° C.) The solid has an infrared spectrum identical to that of the uracil.

Upon dissolving the oxazinone in dilute aqueous solutions of NaOH, $Na_2CO_3$, $NaOOCCH_3$, or even $NaHCO_3$, virtually instantaneous rearrangement to the just-mentioned uracil takes place. This uracil, which is present in the solution in the form of its sodium salt, can be isolated by acidifying the solution. The uracil separates as a syrup which crystallizes on rubbing and melts at 118–120° C. upon recrystallization from alcohol-water.

Example 2.—6-isopropylimino-3,6-dihydro-4-methyl-2H-1,3-oxazin-2-one hydrochloride To a solution of 33.6 parts of N-isopropylacetoacetamide in 33.6 parts of water is added 29.3 parts of concentrated (28%) aqueous ammonia. The resulting solution is stirred at ambient temperature for 6 hours during which time beta-amino-N-isopropylcrotonamide precipitates as a white crystalline solid. It is collected by filtration, washed and air dried to give 28.4 parts of material melting at 142–144° C. This material is sufficiently pure for use as next described but if desired can be further purified by recrystallization from ethyl acetate to obtain a purer material melting at 144–145° C.

A solution of 56.8 parts of the beta-amino-N-isopropylcrotonamide in 400 parts of dioxane is added over a 5 minute period to a stirred solution of 43.6 parts of phosgene in 200 parts of dioxane. The reaction temperature rises to about 50° C. and then begins to decrease at which time heat is applied. After 2 hours at 80–100° C. the yellow slurry is cooled and the solid collected by filtration. It is washed with dioxane and ether and dried in vacuum at 25–30° C. leaving 60.6 parts of 6-isopropylimino-3,6-dihydro-4-methyl-2H-1,3-oxazin-2-one hydrochloride melting at 156–160° C. with gas evolution.

*Analysis.*—Calculated for $C_8H_{12}ClN_2O_2$: N, 13.69. Found: N, 13.79.

Example 3.—6-phenylimino-3,6-dihydro-4-methyl-2H-1,3-oxazin-2-one hydrochloride

To a stirred solution of 88.6 parts of acetoacetanilide in 1500 parts of water and 150 parts of methanol at 73° C. is added 67 parts of concentrated (28%) aqueous ammonia. After several minutes an oil forms and crystallizes after initiation by scratching the wall of the vessel. After 2 hours the slurry is cooled in ice and filtered. The solid is washed with 400 parts of cold water and dried in a vacuum oven at 60° C., leaving 69 parts of beta-amino-N-phenylcrotonamide (78% of theory) melting at 140.5–142.3° C.

A solution of 8.8 parts of the beta-amino-N-phenylcrotonamide in 40 parts of tetrahydrofuran is added over a 10 minute period to a solution of 5.5 parts of phosgene in 25 parts of tetrahydrofuran. The slurry is heated at 60–70° C. for 2 hours, then cooled and the solid collected by filtration, washed with tetrahydrofuran and air dried to give 7.6 parts of 6-phenylimino-3,6-dihydro-4-methyl-2H-1,3-oxazin-2-one hydrochloride melting at 238–244° C. with gas evolution.

*Analysis.*—Calculated for $C_{11}H_{11}ClN_2O_2$: N, 11.74. Found: N, 11.72.

Example 4

The products of the following example are prepared according to the procedure of Example 3 by replacing the acetoacetanilide of that example with molecular equivalents of the acetoacetamides indicated to obtain the specified beta-aminocrotonamide and finally the identified product.

| Acetoacetamide | Aminocrotonomaide | Product |
|---|---|---|
| N-allylacetoacetamide | Beta-amino-N-allylcrotonamide. | 6-allylimino-3,6-dihydro-4-methyl-2H-1,3-oxazin-2-one-hydrochloride. |
| N-(p-tolyl)acetoacetamide. | Beta-amino-N-(p-tolyl) crotonamide. | 6-(p-tolylimino)-3,6-dihydro-4-ethyl-2H-1,3-oxazin-2-one-hydrochloride. |
| N-octylacetoacetamide. | Beta-amino-N-octylcrotonamide. | 6-octylimino-3,6-dihydro-4-methyl-2H-1,3-oxazin-2-one-hydrochloride. |
| N-norbornylacetoacetamide. | Beta-amino-N-norbornylcrotonamide. | 6-norbornylimino-3,6-dihydro-4-methyl-2H-1,3-oxazin-2-one-hydrochloride. |
| N-chloroethylacetoacetamide. | Beta-amino-N-chloroethylcrotonamide. | 6-chloroethylimino-3,6-dihydro-4-methyl-2H-1,3-oxazin-2-one-hydrochloride. |
| N-benzylacetoacetamide. | Beta-amino-N-benzylcrotonamide. | 6-benzylimino-3,6-dihydro-4-methyl-2H-1,3-oxazin-2-one hydrochloride. |
| N-cyclohexenyl-acetoacetamide. | Beta-amino-N-cyclohexenylcrotonamide. | 6-cyclohexenylimino-3,6-dihydro-4-methyl-2H-1,3-oxazin-2-one-hydrochloride. |
| N-methylacetoacetamide. | Beta-amino-N-methylcrotonamide. | 6-methylimino-3,6-dihydro-4-methyl-2H-1,3-oxazin-2-one-hydrochloride. |
| N-o-fluorophenylacetoacetamide. | Beta-amino-N-o-fluorophenylcrotonamide. | 6-(o-fluorophenyl-imino)-3,6-dihydro-4-methyl-2H-1,3-oxazin-2-one-hydrochloride. |
| N-norbornylmethyl-acetoacetamide. | Beta-amino-N-norbornylmethylcrotonamide. | 6-norbornyl-methyl-imino-3,6-dihydro-4-methyl-2H-1,3-oxazin-2-one-hydrochloride. |
| N-(1-ethylpropyl) acetoacetamide. | Beta-amino-N-(1-ethylpropyl) crotonamide. | 6-(1-ethylpropylimino) 3,6-dihydro-4-methyl 2H-1,3-oxazin-2-one-hydrochloride. |
| N-(1,3-dimethylbutyl) acetoacetamide. | Beta-amino-N-(1,3-dimethylbutyl)-crotonamide. | 6-(1,3-dimethylbutyl imino)-3,6-dihydro-4-methyl-2H-1,3-oxazin-2-one-hydrochloride. |
| N-(3a,4,7,7a-tetrahydro-4,7-methanoindan-2-yl) acetoacetamide. | Beta-amino-N-(3a,4, 7,7a-tetrahydro-4,7-methanoindan-2-yl)crotonamide. | 6-(3a,4,7,7a-tetrahydro-4,7-methanoindan-2-ylimino)-3,6-dihydro-methyl-2H-1,3-oxazin-2-one hydrochloride. |
| N-naphthyl-alpha-methyl-acetoacetamide. | Beta-amino-alpha-methyl-N-naphthylcrotonamide. | 6-naphthylimino-3,6-dihydro-4,5-dimethyl-2H-1,3-oxazin-2-one-hydrochloride. |
| 2-keto-N-isopropyl-cyclopentane-carboxamide. | 2-amino-N-isopropyl-1-cyclopentene carboxamide. | 6-isopropylimino-3,6-dihydro-4,5-trimethylene-2H-1,3-oxazin-2-one-hydrochloride. |

| Acetoacetamide | Aminocrotonamide | Product |
|---|---|---|
| N-(3-methoxypropyl)-acetoacetamide. | Beta-amino-N-(3-methoxypropyl)-crotonamide. | 6-(3-methoxypropyl-imino)-3,6-dihydro-4-methyl-2H-1,3-oxazin-2-one-hydrochloride. |
| N-sec-butyl-4-bromo-3-ketobutyramide. | Beta-amino-N-sec-butyl-4-bromo-crotonamide. | 6-sec-butylimino-3,6-dihydro-4-bromo-methyl-2H-1,3-oxazin-2-one-hydrochloride. |
| N-cyclopropyl-3-keto-2-methylbutyramide. | Beta-amino-N-cyclopropyl-2-methylcrotonamide. | 6-cyclopropylimino-3,6-dihydro-4,5-dimethyl-2H-1,3-oxazin-2-one-hydrochloride. |
| N-propynyl-2-butyl-3-ketobutyramide. | Beta-amino-N-propynyl-2-butylcrotonamide. | 6-propynylimino-3,6-dihydro-4-methyl-5-butyl-2H-1,3-oxazin-2-one-hydrochloride. |
| N-octen-2-yl-4-chloro-3-keto-2-methoxy-butylamide. | Beta-amino-N-octen-2-yl-4-chloro-2-methoxycroton-amide. | 6-octen-2-yl-imino-3,6-dihydro-4-chloro-alkyl-5-methoxy-2H-1,3-oxazin-2-one-hydrochloride. |
| N-cyclobutenyl-2-butoxy-3-keto-octanamide. | Beta-amino-N-cyclobutenyl-2-butoxyocten-2-amide. | 6-cyclobutenylimino-3,6-dihydro-4-pentyl-5-butoxy-2H-1,3-oxazin-2-one hydrochloride. |
| N-cyclooctyl-2-keto-cycloheptane-carboxamide. | 2-amino-N-cyclooctyl-cycloheptene-carboxamide. | 6-cyclooctylimino-3,6-dihydro-4,5-pentan-ethylene-2H-1,3-oxazin-2-one-hydrochloride. |
| N-(p-chlorobenzyl)-aceto acetamide. | Beta-amino-N-(p-chlorobenzyl) crotonamide. | 6-(p-chlorobenzyl-imino)-3,6-dihydro-4 methyl-2H-1,3-oxazin-2-one hydrochloride. |
| N-(2-methylcyclopropylmethyl) acetoacetamide. | Beta-amino-N-(2-methylcyclopropylmethyl) crotonamide. | 6-(2-methylcyclopropylmethylimino)-3,6-dihydro-2H-1,3-oxazin-2-one-hydrochloride. |

Example 5.—6-sec-butylimino-3,6-dihydro-4-methyl-2H-1,3-oxazin-2-one

A slurry of 6-sec-butylimino-3,6-dihydro-4-methyl-2H-1,3-oxazin-2-one hydrochloride in methylene chloride is stirred with an excess of silver oxide and filtered after 3 minutes. The solution of the free oxazinone thus obtained is placed immediately in a recording infrared spectrophotometer and the region between 5.5 and 6.1 microns is recorded. The spectrum shows a characteristic oxazinone peak at 5.7 microns (a shift of 0.1 micron to higher wavelength due to neutralization of the HCl salt), but no peak at 5.85 microns which is characteristic of the corresponding 3-sec-butyl-6-methyluracil. The solution is left in the infrared machine and the same region is recorded at various time intervals. The 5.7 micron peak gradually diminishes while a peak at 5.85 microns forms and becomes larger. After 45 minutes the oxazinone peak is all but vanished while the uracil peak is very strong. After one hour and 15 minutes, no trace of the oxazinone peak is left while the uracil peak has reached maximum intensity.

The preceding demonstrates the existence as well as the relative instability of the free oxazinones of the present invention.

Other oxazinones such as the following can be prepared by the procedure of Example 5.

Oxazinone:
  6-phenylimino-3,6-dihydro-4-methyl-2H-1,3-oxazin-2-one
  6-sec-butylimino-5-bromo-3,6-dihydro-4-methyl-2H-1,3-oxazin-2-one
  6-isopropylimino-5-chloro-3,6-dihydro-4-methyl-2H-1,3-oxazin-2-one
  6-norbornylimino-3,6-dihydro-4-methyl-2H-1,3-oxazin-2-one
  6-cyclohexylimino-5-bromo-3,6-dihydro-4-methyl-2H-1,3-oxazin-2-one
  6-tert-butylimino-5-bromo-3,6-dihydro-4-methyl-2H-1,3-oxazin-2-one
  6-imino-3,6-dihydro-4-methyl-2H-1,3-oxazin-2-one
  6-(2-methylcyclohexylimino)-5-chloro-3,6-dihydro-4-methyl-2H-1,3-oxazin-2-one Example 6.—6-sec-butylimino-5-bromo-3,6-dihydro-4-methyl-2H-1,3-oxazin-2-one hydrobromide To a solution of 11 parts of 6-sec-butylimino-3,6-dihydro-4-methyl-2H-1,3-oxazin-2-one hydrochloride in 45 milliliters of water is added dropwise 17.6 parts of bromine while stirring. A precipitate forms. The solid after filtration, washing with water and ether, and drying, weighs 8 parts. Recrystallization from acetic acid yields 6.5 parts of large white crystals melting at 151–154° C. with decomposition.

Analysis.—Calculated for $C_9H_{14}Br_2N_2O_2$: N, 8.2. Found: N, 8.0.

The infrared spectrum is similar to that of the starting material (sharp peak at 5.6 microns) and contains a peak at 15 microns ascribable to the 5-bromo substituent. The bromo compound can be converted to the corresponding 5-bromo-3-sec-butyl-6-methyluracil (M.P. 157–159.5° C.) by the same methods described above for the starting material. The bromo compound is less water soluble than the corresponding chloro compound.

The following products are prepared according to the procedure of Example 6 by replacing the 6-sec-butylimino-3,6 - dihydro - 4 - methyl - 2H - 1,3 - oxazin - 2 - one hydrochloride of that Example with molecular equivalents of the oxazinones indicated to obtain the specified 5-bromo compound.

| Starting oxazinone | Product |
|---|---|
| 6-tert-butylimino-3,6-dihydro-4-methyl-2H-1,3-oxazin-2-one hydrobromide. | 6-tert-butylimino-5-bromo-3,6-dihydro-4-methyl-2H-1,3-oxazin-2-one hydrobromide. |
| 6-phenylimino-3,6-dihydro-4-methyl-2H-1,3-oxazin-2-one hydrobromide. | 6-phenylimino-5-bromo-3,6-dihydro-4-methyl-2H-1,3-oxazin-2-one hydrobromide. |
| 6-isopropylimino-3,6-dihydro-4-methyl-2H-1,3-oxazin-2-one hydrobromide. | 6-isopropylimino-5-bromo-3,6-dihydro-4-methyl-2H-1,3-oxazin-2-one hydrobromide. |
| 6-methylimino-3,6-dihydro-4-methyl-2H-1,3-oxazin-2-one hydrobromide. | 6-methylimino-5-bromo-3,6-dihydro-4-methyl-2H-1,3-oxazin-2-one hydrobromide. |
| 6-(1,3-dimethylbutylimino)-3,6-dihydro-4-methyl-2H-1,3-oxazin-2-one hydrobromide. | 6-(1,3-dimethylbutylimino)-5-bromo-3,6-dihydro-4-methyl-2H-1,3-oxazin-2-one hydrobromide. |
| 6-(p-chlorobenzylimino)-3,6-dihydro-4-methyl-2H-1,3-oxazin-2-one hydrobromide. | 6-(p-chlorobenzylimino)-5-bromo-3,6-dihydro-4-methyl-2H-1,3-oxazin-2-one hydrobromide. |
| 6-(cyclobutenylmethylimino)-3,6-dihydro-4-methyl-2H-1,3-oxazin-2-one hydrobromide. | 6-(cyclobutenylmethylimino)-5-bromo-3,6-dihydro-4-methyl-2H-1,3-oxazin-2-one hydrobromide. |

Example 7.—6-sec-butylimino-5-chloro-3,6-dihydro-4 - methyl - 2H - 1,3 - oxazin - 2 - one hydrochloride A slurry of 15 parts by weight of 6-sec-butylimino-3,6-dihydro-4-methyl-2H-1,3-oxazine-2-one hydrochloride in 75 milliliters of glacial acetic acid is stirred at room temperature while chlorine gas is introduced. The slurry comes thinner at first, and then a thick white precipitate forms which is filtered, washed with acetic acid and acetone, and dried. It weighs 12 parts and melts at 144–150° C.

Analysis.—Calculated for $C_9H_{14}Cl_2N_2O_2$: N, 11.1. Found N, 10.9.

The infrared spectrum of this product is very similar to that of the starting material (sharp peak at 5.6 microns). It contains an additional peak at 14.5 microns ascribable to the 5-chloro substituent. The chloro compound is converted to the corresponding 5-chlorouracil (M.P. 152–153.5° C.) in the same manner as described above for the starting oxazinone by heating above the melting point or treatment with dilute aqueous solutions of NaOH, $Na_2CO_3$, $NaOOCCH_3$ or $NaHCO_3$. The water solubility of the 5-chloro oxazinone is about 8% by weight at room temperature.

The following products are prepared according to the procedure of Example 7 by replacing the 6-sec-butylimino-3,6 - dihydro - 4 - methyl - 2H - 1,3 - oxazin - 2 - one hydrochloride of that example with molecular equivalents of the oxazinones indicated to obtain the speciged 5-chloro compound.

| Starting oxazinone | Product |
|---|---|
| 6-isopropylimino-3,6-dihydro-4-methyl-2H-1,3-oxazin-2-one hydrochloride. | 6-isopropylimino-5-chloro-3,6-dihydro-4-methyl-2H-1,3-oxazin-2-one hydrochloride. |
| 6-ethylimino-3,6-dihydro-4-methyl-2H-1,3-oxazin-2-one hydrochloride. | 6-ethylimino-5-chloro-3,6-dihydro-4-methyl-2H-1,3-oxazin-2-one hydrochloride. |
| 6-imino-3,6-dihydro-4-methyl-2H-1,3-oxazin-2-one hydrochloride. | 6-imino-5-chloro-3,6-dihydro-4-methyl-2H-1,3-oxazin-2-one hydrochloride. |
| 6-norbornylimino-3,6-dihydro-4-methyl-2H-1,3-oxazin-2-one hydrochloride. | 6-norbornylimino-5-chloro-3,6-dihydro-4-methyl-2H-1,3-oxazin-2-one hydrochloride. |
| 6-tert-butylimino-3,6-dihydro-4-methyl-2H-1,3-oxazin-2-one hydrochloride. | 6-tert-butylimino-5-chloro-3,6-dihydro-4-methyl-2H-1,3-oxazin-2-one hydrochloride. |
| 6-(4-methoxycyclohexylimino)-3,6-dihydro-4-methyl-2H-1,3-oxazin-2-one hydrochloride. | 6-(4-methoxycyclohexylimino)5-chloro-3,6-dihydro-4-methyl-2H-1,3-oxazin-2-one hydrochloride. |
| 6-[1-(2-methyl-1-cyclopentenyl)-ethylimino]-3,6-dihydro-4-methyl-2H-1,3-oxazin-2-one hydrochloride. | 6-[1-(2-methyl-1-cyclopentenyl)-ethylimino]-5-chloro-3,6-dihydro-4-methyl-2H-1,3-oxazin-2-one hydrochloride. |
| 6-(3-meth-2-cyclopententlimino)-3,6-dihydro-4-methyl-2H-1,3-oxazin-2-one hydrochloride. | 6-(3-methyl-2-cyclopentenylimino)-5-chloro-3,6-dihydro-4-methyl-2H-1,3-oxazin-2-one hydrochloride. |

In one very important use for the compounds of Formula 1, they are readily converted to uracils.

The conversion of the oxazinone derivative can be carried out using the slurry of the oxazinone hydrochloride salt formed as described above in Step 2 of our process from the phosgenation of the aminocrotonamide or, in the alternative, where the oxazinone salt has been recovered in solid cyrstalline form, the oxazinone salt can be admixed with a suitable inert liquid such as water or organic solvent to form a solution or slurry.

The slurry from either source is admixed with sufficient aqueous base, such as sodium hydroxide, potassium hydroxide, sodium carbonate, etc. to neutralize the acid salt to pH 7 or above and preferably to bring the pH within the range of about 8 to 10. This results in almost immediate conversion to a solution of the uracil salt, which in turn is easily converted to the corresponding uracil with an acid such as sulfuric acid, hydrochloric acid, or the like. Other acids such as acetic acid, formic acid, etc. are also satisfactory as will be understood but are of course more expensive. The uracils are isolated by filtration or, since in some cases they are soluble in the aqueous medium, they are isolated where appropriate by extraction with a suitable solvent such as methylene chloride, ether or the like.

Instead of proceeding by formation of the uracil salt followed by acidification, it will be understood that the oxazinone can be directly converted to the uracil by admixing with the oxazinone in the liquid system just sufficient base to neutralize the salts, i.e., one mol of base per mol of the oxazinone salt. With weak bases such as sodium bicarbonate, excess base still allows recovery of the free uracil.

Whether carried out by converting the oxazinone directly to the uracil or first forming the uracil salt and then acidifying to the uracil, we have discovered that the yields of uracil based on the oxazinone compound are essentially quantitative.

As will also be understood, we have invented in another important aspect an overall process, which can be carried out in a series of separate or combined steps, a remarkably efficient route for the preparation of uracils from commercially available and relatively inexpensive starting materials. Our overall process thus comprises the steps of:

*Step A.*—Reacting a substituted acetoacetamide of the formula

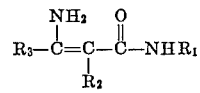

where $R_1$, $R_2$ and $R_3$ have the same meaning as in Formula 1, with ammonia to produce a beta-aminocrotonamide of the formula

*Step B.*—Reacting the beta-aminocrotonamide with phosgene $$Cl-\overset{O}{\underset{\|}{C}}-Cl$$

to obtain a reaction product, and

*Step C.*—Reacting the reaction product of step B with an inorganic base and, if necessary, an acidifying agent to produce a uracil of the formula 3.

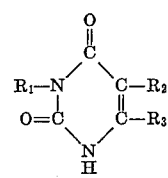

In a preferred process, the preceding overall process is carried out with the preliminary step of preparing the beta-aminocrotonamide from diketene and an amine.

In a particularly preferred embodiment, our process involves reacting diketene with an amine according to the following:

The acetoacetamide is then reacted with ammonia in a suitable reaction medium, preferably using from 1 to 10 mols of ammonia for each mol of acetoacetamide, at a temperature in the range from −30° to +30° C. for 1–10 hours to produce a beta-aminocrotonamide as follows:

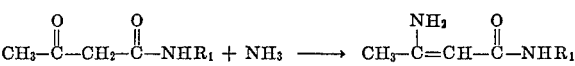

The aminocrotonamide is next phosgenated in suitable medium, preferably using from 1 to 2 mols of phosgene for each mol of aminocrotonamide, at a temperature in the range from 40° to 100° C. for ½–6 hours to produce the oxazinone hydrochloride in the system as follows:

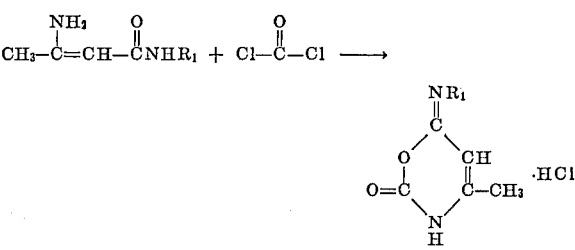

The oxazinone derivative is next converted at pH 9–10 with a base such as sodium hydroxide to form the corresponding uracil salt which in turn is converted by treatment with an acid such as sulfuric acid to the corresponding uracil of the formula:

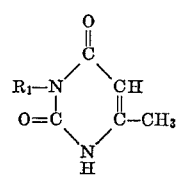

The class of 3-substituted uracils and 5-halogenated 3-substituted uracils are particularly outstanding herbicides, giving unusually effective control of undesired vegetation at economic rates.

The above-described process for preparing uracils, and in particular the uracils of Formula 4, is notably advantageous because it is a rapid, high yield approach to the synthesis of useful uracils employing as the only essential reactants the diketene, amines, phosgene and an alkali. None of these starting materials need be converted with extra expense and difficulty to extraneous intermediates before use in this invention.

The following examples are given in addition to those above to illustrate the conversion of oxazinones to corresponding uracils, either directly or through the uracil salt, as well as the embodiment of the overall process of preparation of uracils through the corresponding oxazinone. These examples are likewise given for purposes of illustration only and no unnecessary limitation is intended therefrom. Parts and percentages are by weight unless otherwise indicated.

Example 8

To a stirred solution of 10.9 parts of phosgene in 50 parts of tetrahydrofuran is added, over a 15 minute period at ambient temperature, a solution of 15.6 parts of beta-amino-N-sec-butylcrotonamide prepared as described in Example 1, in 40 parts of tetrahydrofuran. The temperature rises during the addition to about 50° C. and a yellow slurry forms. This slurry is heated at reflux for 2 hours. The solid present in the slurry at this point is 6 - sec-butylimino-3,6-dihydro-4-methyl-2H-1,3-oxazin-2-one hydrochloride. The slurry is then poured into 200 parts of 2 N aqueous sodium hydroxide, with stirring. The resulting solution is extracted twice with 100 parts of methylene chloride to remove alkali-insoluble organic impurities. The aqueous portion is then acidified with concentrated hydrochloric acid and the resulting 3-sec-butyl-6-methyluracil is isolated by extracting four times with 100 parts each of methylene chloride. Evaporation of the solvent leaves 13.4 parts of the uracil.

Example 9

A solution of 9.6 parts of beta-amino-N-phenylcrotonamide (prepared as in Example 3) in 40 parts of tetrahydrofuran is added to a stirred solution of 5.5 parts of phosgene in 25 parts of tetrahydrofuran over a 15 minute period. After the initial exothermic reaction has subsided, the mixture is heated at 63-67° C. for 2 hours. It is then cooled and poured into 200 parts of 2 N aqueous sodium hydroxide. After extraction twice with 150 parts each of methylene chloride to remove impurities, the aqueous solution is acidified with concentrated hydrochloric acid. The product is isolated by extraction six times with 100 parts each of methylene chloride, followed by evaporation of the methylene chloride. There is obtained 7.5 parts of 3-phenyl-6 methyluracil, melting at 244-250° C.

As mentioned above the compounds of Formula 1 and especially those indicated to be preferred are effective herbicides. They exert herbicidal action against both broadleaf and grass weeds, as effective against hard-to-kill nutsedge and perennial grasses such as quack grass, Johnson grass, and Bermuda grass, and are effective on highly adsorptive substrates such as railroad ballast, heavy clay soil, and soils high in organic matter.

This combination of properties makes these compounds useful wherever general weed control is required, such as industrial areas, railroad rights-of-way, and areas adjacent to croplands in agricultural areas.

Certain of the compounds of this invention also exhibit selective herbicidal action in crops. By properly selecting an oxazinone of the invention and a rate and time of application, annual grass and broadleaf seedlings in such crops as asparagus, corn, flax, sugar cane, pineapple, safflower, peanuts, citrus, alfalfa, strawberries, gladiolus, stone fruits and cucurbits can be controlled.

By proper selection of rate and time of application, certain of the oxazinones can also be used to control weeds growing in dormant crops.

The precise amounts of oxazinones to be used in any given situation will, of course, vary according to the particular end result desired, the use involved, the plant and soil involved, the formulation used, the mode of application, prevailing weather conditions, foilage density and like factors. Since so many variables play a role, it is not possible to indicate a rate of application suitable for all situations. Broadly speaking, the compounds are used at levels of about ¼ pound per acre to about 25 pounds per acre. For selective weed control in crops, rates of ¼ to 8 pounds per acre will generally be used. More of the active material can be used to control difficult-to-kill species growing under adverse conditions. Economic factors, such as inaccessibility of the area to be treated, e.g., fire breaks in forests, may also favor higher rates, with less frequent treatments.

The herbicidal compounds of this invention can be formulated as dusts, as wettable powders, or as soluble powders. In these formulations, care must be taken that diluents, surface active agents, and other pesticidal additives are neutral in pH and are particularly free of reserve alkalinity. It is also important that the formulation ingredients are dry and that during handling of the ingredients, preparation of the compositions, and storage of the compositions, water be rigidly excluded. Insofar as possible, the diluents and surfactants and other additives should also be inert chemically and should be reasonably free of active OH groups.

In view of the preceding, particularly advantageous results are obtained using the following, where percentages are by weight.

| | Percent |
|---|---|
| Active ingredient (oxazinone salt) | 30-60 |
| Non-ionic surfactant | 0.1-10 |
| Remainder—inert diluents, substantially anhydrous to 100%. | |

By substantially anhydrous is meant that the maximum amount of water present is 1% by weight based on the weight of the oxazinone salt present.

Suitable diluents for the preparation of dusts and wettable powders are finely divided, pulverulent solids, with neutral or slightly acidic surface reactions such as synthetic fine silicas, diatomaceous earths, and acidic kaolinite clays. Examples of the above are "Hi-Sil," "Celiate" 209, Continental clay, Barnet clay, and Pike's Peak clay 9T66. Other diluents which can sometimes be used may be inert vegetable flours, such as Redwood flour, walnut shell flour, and the like.

When such diluents are to be used in the preparation of herbicidal dusts, the active ingredient will preferably be present in amounts ranging from 0.5 to 15%, with the remainder primarily being one or more of the above-named diluents. When the composition to be prepared is a wettable powder, the active ingredient may be present in amounts ranging from 10 to about 85%, the remainder being diluent except for the presence of from about 0.1 to 5% or 10% of one or more of the surfactants described below.

The surfactants for these compositions can be of the anionic, cationic, and non-ionic type, although anionic surfactants are preferred and non-ionic surfactants are very much preferred. It is important that the anionic surfactants not be highly alkaline, and with this limitation, surfactants such as salts of alkyl aryl sulfonic acids, and petroleum sulfonates and salts of fatty alcohol sulfates can be used. A list of such surfactants is shown in "Detergents and Emulsifiers Up-to-Date, 1962," by John W. McCutcheon, Inc. Other anionic surfactants that can be used may be salts of dialkyl esters of sulfosuccinates and of fatty acid esters of isethionic acids. In some instances, the free acid instead of the salt can also be advantageously used.

Among the very much preferred nonionic surfactants are polyethylene glycol fatty esters, and polyoxyethylene ethers and thioethers. Other nonionic compounds are alkylphenoxypolyethyleneoxyethanols, such as nonylphenyl adducts with ethylene oxide, trimethylnonylpolyethylene glycol ethers, polyethylene oxide adducts of fatty and rosin acids, polyethylene oxide adducts of sorbitan esters of fatty and rosin acids, and long chain alkyl mercaptan adducts with ethylene oxide. Particularly preferred may be polyglycol ethers in which both terminal alcohol groups have been esterified with fatty acids such as lauric, oleic, palmitic, or stearic acids.

It is often also desirable to formulate the compounds of this invention as soluble solids. Such compositions consist of from 75 to 95% of the active ingredient with the remainder being one or more of the above-mentioned surface active agents. In order to prepare these compositions, the diluent and/or the surfactant is blended with the active ingredient in the conventional manner in a ribbon blendor or similar device, and the mixture is then ground. As stated above, care must be taken to exclude moisture.

Other surface active dispersing agents, such as low viscosity methyl cellulose, or substantially neutral sodium lignosulfonates are also useful, especially in the wettable powder compositions of this invention.

FORMULATION WITH OTHER HERBICIDES

The herbicidal compositions of this invention can be formulated to contain two or more of the oxazinone salts. They can also be formulated to contain other known herbicides in addition to the oxazinones to give compositions which have advantages over the individual components.

Among the known herbicides which can be combined with the compounds of Formula 1 are—

Substituted ureas:
    3-(3,4-dichlorophenyl)-1,1-dimethylurea
    3-(4-chlorophenyl)-1,1-dimethylurea
    3-phenyl-1,1-dimethylurea
    3-(3,4-dichlorophenyl)-3-methoxy-1,1-dimethylurea
    3-(4-chlorophenyl)-3-methoxy-1,1-dimethylurea
    3-(3,4-dichlorophenyl)-1-n-butyl-1-methylurea
    3-(3,4-dichlorophenyl)-1-methoxy-1-methylurea
    3-(4-chlorophenyl)-1-methoxy-1-methylurea
    3,(3-4-dichlorophenyl)-1,1,3-trimethylurea
    3,(3,4-dichlorophenyl)-1,1-diethylurea
    3-(p-chlorophenoxyphenyl)-1,1-dimethylurea These ureas can be mixed with the oxazinones of this invention in proportions of from 1:4 to 4:1, respectively, the preferred ratio being 1:2 to 2:1.

Substituted triazines:
    2-chloro-4,6-bis(ethylamino)-s-triazine
    2-chloro-4-ethylamino-6-isopropylamino-s-triazine
    2-chloro-4,6-bis(methoxypropylamino)-s-triazine
    2-methoxy-4,6-bis(isopropylamino)-s-triazine
    2-diethylamino-4-isopropylacetamido-6-methoxy-s-triazine
    2-isopropylamino-4-methoxyethylamino-6-methylmercapto-s-triazine
    2-methylmercapto-4,6-bis(isopropylamino)-s-triazine
    2-methylmercapto-4,6-bis(ethylamino)-s-triazine
    2-methylmercapto-4-ethylamino-6-isopropylamino-s-triazine
    2-methoxy-4,6-bis(ethylamino)-s-triazine
    2-methoxy-4-ethylamino-6-isopropylamino-s-triazine
    2-chloro-4,6-bis(isopropylamino)-s-triazine There triazines can be mixed with the compounds of this invention in proportions of from 1:4 to 4:1, respectively, the preferred ratio being 1:2 to 2:1.

Phenols:
    Dinitro-o-sec-butylphenol and its salts
    Pentachlorophenol and its salts These phenols can be mixed with the compounds of this invention in the proportions of 1:10 to 20:1, respectively, the preferred ratio being 1:5 to 5:1.

Carboxylic acids and derivatives: The following carboxylic acids and derivatives can be mixed with the compounds of this invention in the listed proportions:

A. 2,3,6-trichlorobenzoic acid and its salts
    2,3,5,6-tetrachlorobenzoic acid and its salts
    2-methoxy-3,5,6-trichlorobenzoic acid and its salts
    2-methoxy-3,6-dichlorobenzoic acid and its salts
    3-amino-2,5-dichlorobenzoic acid and its salts
    3-nitro-2,5-dichlorobenzoic acid and its salts
    2-methyl-3,6-dichlorobenzoic acid and its salts
    2,4-dichlorophenoxyacetic acid and its salts and esters
    2,4,5-trichlorophenoxyacetic acid and its salts and esters
    (2-methyl-4-chlorophenoxy)acetic acid and its salts and esters
    2-(2,4,5-trichlorophenoxy)propionic acid and its salts and esters
    2-(2,4,5-trichlorophenoxy)ethyl-2,2-dichloropropionate
    4-(2,4-dichlorophenoxy)butyric acid and its salts and esters
    4-(2-methyl-4-chlorophenoxy)butyric acid and its salts and esters
    2,3,6-trichlorobenzyloxypropanol Mixed in a 1:16 to 8:1 ratio, preferably a 1:4 to 4:1 ratio.

B. 2,6-dichlorobenzonitrile

Mixed in a 1:4 to 4:1 ratio, preferably a 1:3 to 3:1 ratio.

C. Trichloroacetic acid and its salts

Mixed in a 1:2 to 25:1 ratio, preferably a 1:1 to 8:1 ratio.

D. 2,2-dichloropropionic acid and its salts

Mixed in a 1:4 to 8:1 ratio, preferably a 1:2 to 4:1 ratio.

E. N,N-di(n-propyl)thiolcarbamic acid, ethyl ester
    N,N-di(n-propyl)thiolcarbamic acid, n-propyl ester
    N-ethyl-N-(n-butyl)thiolcarbamic acid, ethyl ester
    N-ethyl-N-(n-butyl)thiolcarbamic acid, n-propyl ester Mixed in a 1:2 to 24:1 ratio, preferably a 1:1 to 12:1 ratio.

F. N-phenylcarbamic acid, isopropyl ester
    N-(m-chlorophenyl)carbamic acid, isopropyl ester
    N-(m-chlorophenyl)carbamic acid, 4-chloro-2-butynyl ester Mixed in a 1:2 to 24:1 ratio, preferably a 1:1 to 12:1 ratio.

G. 2,3,6-trichlorophenylacetic acid and its salts

Mixed in a 1:12 to 8:1 ratio, preferably a 1:4 to 4:1 ratio.

H. 2,chloro-N,N-diallylacetamide
    Maleic hydrazide

Mixed in a 1:2 to 10:1 ratio, preferably a 1:1 to 5:1 ratio.

Inorganic and mixed inorganic-organic salts: The following salts can be mixed with the oxazinones in the listed proportions.

A. Calcium propylarsonate
    Disodium monomethylarsonate
    Octyl-dodecylammoniummethylarsonate
    Dimethylarsinic acid Mixed in a 1:4 to 4:1 ratio, preferably a 1:2 to 2:1 ratio.

B. Sodium arsenite

Mixed in a 1:5 to 40:1 ratio, preferably a 1:4 to 25:1 ratio.

C. Lead arsenate
   Calcium arsenate

Mixed in a 150:1 to 600:1 ratio, preferably a 100:1 to 400:1 ratio.

D. Sodium tetraborate hydrated, granulated
   Sodium metaborate
   Sodium pentaborate
   Polyborchlorate
   Unrefined borate ore such as borascu Mixed in a 3:1 to 1500:1 ratio, preferably a 6:1 to 1000:1 ratio.

E. Ammonium thiocyanate

Mixed in a 1:10 to 20:1 ratio, preferably a 1:5 to 5:1 ratio.

F. Sodium chlorate

Mixed in a 1:1 to 40:1 ratio, preferably a 2:1 to 20:1 ratio.

G. Ammonium sulfamate

Mixed in a 1:1 to 100:1 ratio, preferably a 1:1 to 50:1 ratio.

Other organic herbicides: These organic herbicides can be mixed with the oxazinone salts in the listed proportions:

A. 5,6 - dihydro - (4A,6A)-dipyrido-(1,2-A,2',1'-C)pyrazinium dibromide

Mixed in a 1:20 to 16:1 ratio, preferably a 1:5 to 5:1 ratio.

B. 3-amino-1,2,4-triazole

Mixed in a 1:20 to 20:1 ratio, preferably a 1:5 to 5:1 ratio.

C. 3,6-endoxohexahyrophthalic acid

Mixed in a 1:3 to 20:1 ratio, preferably a 1:2 to 10:1 ratio.

D. Hexachloroacetone

Mixed in a 1:2 to 16:1 ratio, preferably a 1:1 to 8:1 ratio.

E. Diphenylacetonitrile
   N,N-dimethyl-α,α-diphenylacetamide
   N,N-di-n-propyl-2,6-dinitro-4-trifluoromethylaniline
   N,N-di-n-propyl-2,6-dinitro-4-methylaniline Mixed in a 1:10 to 30:1 ratio, preferably a 1:5 to 20:1 ratio.

F. O - (2,4-dichlorophenyl)-O-methyl-isopropylphosphoramidothiate
   2,3,5,6-tetrachloroterephthalic acid, dimethyl ester Mixed in a 1:4 to 20:1 ratio, preferably a 1:3 to 15:1 ratio.

G. 2,4-dichloro-4'-nitrodiphenyl ether

Mixed in a 1:10 to 30:1 ratio, preferably a 1:5 to 20:1 ratio.

Substituted uracils: These oxazinone salts can be mixed with substituted uracils, in the proportions listed below. All of the indicated ratios are weight ratios. Methods for the preparation of the listed uracils can be found in copending applications Ser. Nos. 233,952, filed Oct. 29, 1962; 241,141, filed Nov. 30, 1962; 221,890, filed Sept. 6, 1962; 232,311, filed Oct. 22, 1962; and 217,521, filed Aug. 17, 1962.

A. 3-cyclohexyl-6-methyluracil
   3-cyclohexyl-6-ethyluracil
   3-cyclohexyl-6-sec-butyluracil
   3-norbornyl-6-methyluracil
   3-cyclopentyl-6-methyluracil
   3-cyclohexyl-6-isopropyluracil Mixed in a 1:4 to 4:1 ratio, preferably a 1:2 to 2:1 ratio.

B. 3-cyclohexyl-5,6-trimethyleneuracil
   3-sec-butyl-5,6-trimethyleneuracil
   3-isopropyl-5,6-trimethyleneuracil
   3-isopropyl-5,6-tetramethyleneuracil
   3-isopropyl-5,6-pentamethyleneuracil Mixed in a 1:6 to 6:1 ratio, preferably a 1:4 to 4:1 ratio.

C. 3-cyclohexyl-5-bromouracil
   3-cyclohexyl-5-chlorouracil
   3-isopropyl-5-bromouracil
   3-sec-butyl-5-bromouracil
   3-sec-butyl-5-chlorouracil Mixed in a 1:6 to 6:1 ratio, preferably a 1:2 to 2:1 ratio.

D. 3 - isopropyl-1-trichloromethylthio-5-bromo-6-methyluracil
   3 - cyclohexyl - 1 - trichloromethylthio - 5 - bromo - 6-methyluracil
   3-sec-butyl-1-acetyl-5-bromo-6-methyluracil
   3-isopropyl-1-acetyl-5-bromo-6-methyluracil
   3 - isopropyl-1-trichloromethylthio-5-chloro-6-methyluracil Mixed in a 1:4 to 4:1 ratio, preferably a 1:2 to 2:1 ratio.

E. 3-sec-butyl-5-bromo-6-methyluracil
   3-isopropyl-5-bromo-6-methyluracil
   3-sec-butyl-5-chloro-6-methyluracil
   3-phenyl-5-bromo-6-methyluracil
   3-(1,3-dimethylbutyl)-5-bromo-6-methyluracil
   3-(1-ethylpropyl)-5-chloro-6-methyluracil
   3-cyclohexyl-5-bromo-6-methyluracil Mixed in a 1:4 to 4:1 ratio, preferably a 1:2 to 2:1 ratio.

In order that the herbicidal utility aspects of the present invention will be better understood the following illustrative examples are given in addition to those set forth above.

Example 10

| | Percent |
|---|---|
| 6 - norbornylmethylimino-3,6-dihydro-4-methyl-2H-1,3-oxazin-2-one hydrochloride | 80 |
| Polyethylene glycol dioleate | 5 |
| "Hi-Sil" | 15 |

The ingredients are blended and ground in a hammer mill until the particle size of substantially all the active ingredients is below 50 microns.

This wettable powder is used for the control of annual broadleaf and grass weeds growing around telephone poles and highway markers. An application of 5 pounds of active ingredient per acre in 40 gallons of water gives excellent control of crab grass, water grass, black-eyed susan, carpetweed, and chickweed.

Example 11

| | Percent |
|---|---|
| 6-tert-butylimino - 5 - bromo-3,6-dihydro-4-methyl-2H-1,3-oxazin-2-one hydrobromide | 80.0 |
| Sodium lauryl sulfate | 0.6 |
| Partially desulfonated sodium lignin sulfonate | 1.0 |
| Calcined, non-swelling montmorillonoid type clay (Pike's Peak clay) | 18.4 |

A wettable powder is prepared by blending the components and then micropulverizing them until substantially all the particles are below 50 microns in size.

This formulation is used at 20 pounds of active ingredient per acre in 100 gallons of water for weed control around oil tank installations and on railroad ballast. Excellent control of quack grass, crab grass, goose grass, Johnson grass, bitterweed, oxeye daisy, mare's-tail, maple oak, and willow brush is obtained.

At 30 pounds of active ingredient per acre as a spot treatment, excellent control of such deep-rooted weeds as bindweed and Canada thistle is obtained.

Example 12

|  | Percent |
|---|---|
| 6-isopropylimino - 5 - bromo-3,6-dihydro-4-methyl-2H-1,3-oxazin-2-one hydrobromide | 80.0 |
| Sodium lauryl sulfate | 0.6 |
| Sodium lignin sulfonate | 2.0 |
| Kaolin clay | 17.4 |

These components are blended and micropulverized until the solids are substantially all below 50 microns in particle size. The mixture is then reblended until it is homogeneous.

This wettable powder is used as a general purpose weed killer on industrial sites and railroad ballast. Ten to twenty pounds of active ingredient per acre in 100 gallons of water gives excellent control of goldenrod, evening primrose, pokeweed, oxeye daisy, cocklebur, goose grass, crab grass, and love grass.

Twenty pounds of active ingredient per acre in 50 gallons water gives excellent control of nutsedge.

Example 13

|  | Percent |
|---|---|
| 6-sec-butylimino - 5 - bromo-3,6-dihydro-4-methyl-2H-1,3-oxazin-2-one hydrobromide | 95 |
| Polyethylene glycol ester of fatty and rosin acids concreted with urea | 5 |

The ingredients are mixed and ground and can then be mixed with water for prompt spray application as a solution.

This formulation is used at 1 to 2 pounds of active ingredient per acre in 30 gallons of water for the post-emergence control of annual weeds in sugar cane. A directed spray to seedling crab grass, water grass, pigweed, and lamb's-quarters gives excellent control of these weeds.

Example 14

|  | Percent |
|---|---|
| 6 - norbornylmethylimino-3,6-dihydro-4-methyl-2H-1,3-oxazin-2-one hydrochloride | 40 |
| Soya lecithin | 3 |
| Substantially aliphatic, low viscosity mineral oil, e.g., kerosene or diesel oil | 57 |

The oil suspension is prepared by pregrinding the active material and mixing it with the other components with agitation, or by blending all the components together, then pebble-milling or sand-milling them to reduce the particle size of the active component. The product is suitable for dilution with weed oils to form an oil spray.

This formulation is diluted with 80 gallons of a herbicidal oil such as Lion Herbicidal Oil No. 6 and applied at 12 pounds of active ingredient per acre for general overall weed control along cyclone fences and railroad ballast.

Good control is obtained for several months. Quack grass, cheat, witch grass, buttonweed, and jimson weed are controlled.

Example 15

|  | Percent |
|---|---|
| 6-cyclohexylimino - 5-chloro-3,6-dihydro-4-methyl-2H-1,3-oxazin-2-one hydrochloride | 90.0 |
| Alkyl naphthalene sulfonate, Na salt | 2.0 |
| Low viscosity methyl cellulose | 0.3 |
| Attapulgite clay | 7.7 |

These components are blended and micropulverized until the particles of uracil have been reduced to about 10 microns in diameter, then reblended.

This formulation gives excellent weed control when applied preemergence or postemergence at rates of 4 pounds per acre to crab grass, wild oats, wild mustard, volunteer alfalfa, foxtail and lamb's-quarters.

Example 16

|  | Percent |
|---|---|
| 6-sec-butylimino - 5 - chloro-3,6-dihydro-4-methyl-2H-1,3-oxazin-2-one hydrochloride | 10 |
| "Celite" 209 | 10 |
| Kaolinite clay (acidic) | 80 |

The active ingredient and the "Celite" are blended and ground in a hammer mill until the mixture is uniform and the particle size of substantially all of the material is below 50 microns. This dust concentrate is then mixed with the kaolinite clay and the mixture is deagglomerated in a device such as an Entoleter mill to obtain a smooth free-flowing uniform dust.

This composition is used for the control of mixtures of annual and perennial weeds growing around farm buildings. An application of 15 pounds of active material per acre gives excellent control of pepper grass, wild mustard, burdock, quack grass, and crab grass.

Example 17

|  | Percent |
|---|---|
| 6-sec-butylimino - 5 - bromo-3,6-dihydro-4-methyl-2H-1,3-oxazin-2-one hydrobromide | 25 |
| Granular 8–15 mesh attapulgite clay | 75 |

A granular composition is prepared by suspending the active ingredient in acetone and spraying this solution on the attapulgite granules while they are tumbled. The resulting granules are then dried.

The granules are applied by hand for "spot treatment" of undesirable bunch grasses growing in agricultural areas. An application of 20 to 30 pounds of active ingredient per acre gives good control of Dallis and Vasey grass.

The invention claimed is:

1. A compound of the formula:

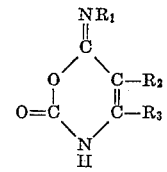

where
  $R_1$ is selected from the group consisting of hydrogen; alkyl of 1 through 10 carbon atoms; substituted alkyl of 1 through 8 carbon atoms wherein said substituent is selected from the group consisting of bromine, chlorine, hydroxy, alkoxy of 1 through 7 carbon atoms, alkoxycarbonyl of 2 through 7 carbon atoms; cyano; aryl selected from the group consisting of phenyl, naphthyl, biphenylyl, dialkylphenyl of 8 through 12 carbon atoms, chloroalkylphenyl of 7 through 10 carbon atoms, tetrahydronaphthyl and indenyl; substituted phenyl wherein said substituent is selected from the group consisting of chlorine, bromine, fluorine, nitro, alkoxy of 1 through 4 carbon atoms, alkyl of 1 through 5 carbon atoms, trifluoromethyl, 1,2-tetramethylene and 1,2-trimethylene; aralkyl selected from the group consisting of furfuryl, benzyl, phenylalkyl of 8 through 11 carbon atoms, and naphthylmethyl; substituted aralkyl of 5 through 13 carbon atoms wherein said substituent is selected from the group consisting of chlorine, nitro, alkyl of 1 through 4 carbon atoms and methoxy; alkenyl of 3 through 8 carbon atoms; alkynyl of 3 through 8 carbon atoms; cycloalkyl of 3 through 12 carbon atoms; substituted cycloalkyl of 3 through 12 carbon atoms wherein said substituent is selected from the group consisting of bromine, fluorine, methoxy and alkyl of 1 through 4 carbon atoms; cycloalkylenyl of 4 through 12 carbon atoms; substituted cycloalkenyl of 4 through 12 carbon atoms wherein said substituent is selected from the group consisting of bromine, chlorine, methoxy and alkyl of 1 through 4 carbon atoms; cycloalkyl alkyl of 4 through 13 carbon atoms; cycloalkenyl alkyl of 5 through 13 carbon atoms; (substituted cycloalkyl)-alkyl of 4 through 14 carbon atoms wherein said substituent is selected from the group consisting of bromine, chlorine, methoxy and alkyl of 1 through 4 carbon atoms; and (substituted cycloalkenyl)alkyl of 5 through 14 carbon atoms wherein said substituent is selected from the group consisting of bromine, chlorine, methoxy, and alkyl of 1 through 4 carbon atmos;

$R_2$ is selected from the group consisting of hydrogen, chlorine, bromine, methyl, ethyl, n-propyl, isopropyl, n-butyl, sec.-butyl, tert.-butyl, methoxy, ethoxy, n-propoxy, isopropoxy, n-butoxy, sec.-butoxy, and tert.-butoxy; and $R_3$ is selected from the group of alkyl of 1 through 5 carbon atoms, chloroalkyl of 1 through 4 carbon atoms, and bromoalkyl of 1 through 4 carbon atoms; with the proviso that $R_2$ and $R_3$ can be joined together to form —$(CH_2)_n$— where $n$ is a positive whole number from 3 through 5; and acid salts of said compound.

2. A compound as set forth in claim 1 wherein $R_1$ is as defined and other than hydrogen.

3. A compound as set forth in claim 2 wherein $R_3$ is methyl, provided that when $R_2$ is hydrogen, $R_1$ is other than methyl and ethyl.

4. A compound of the formula:

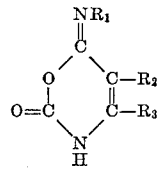

where
$R_1$ is selected from the group consisting of alkyl of 1 through 10 carbon atoms; substituted alkyl of 1 through 8 carbon atoms wherein said substituent is selected from the group consisting of bromine, chlorine, hydroxy, alkoxy of 1 through 7 carbon atoms, alkoxy carbonyl of 2 through 7 carbon atoms, and cyano; aryl selected from the group consisting of phenyl, naphthyl, biphenylyl, dialkylphenyl of 8 through 12 carbon atoms, tetrahydronaphthyl and indenyl; substituted phenyl wherein said substituent is selected from the group consisting of chlorine, bromine, fluorine, nitro, alkoxy of 1 through 4 carbon atoms, alkyl of 1 through 5 carbon atoms, trifluoromethyl, 1,2-tetramethylene and 1,2-trimethylene; aralkyl selected from the group consisting of furfuryl, benzyl, phenylalkyl of 8 through 11 carbon atoms and naphthylmethyl; substituted aralkyl of 5 through 13 carbon atoms wherein said substituent is selected from the group consisting of chlorine, nitro, alkyl of 1 through 4 carbon atoms and methoxy; alkenyl of 3 through 8 carbon atoms; alkynyl of 3 through 8 carbon atoms; cycloalkyl of 3 through 12 carbon atoms; substituted cycloalkyl of 3 through 13 carbon atoms wherein said substituent is selected from the group consisting of bromine, fluorine, methoxy and alkyl; cycloalkenyl of 4 through 12 carbon atoms; substituted cycloalkenyl of 4 through 12 carbon atoms wherein said substituent is selected from the group consisting of bromine, chlorine, methoxy, and alkyl; cycloalkyl alkyl of 4 through 13 carbon atoms; cycloalkenyl alkyl of 5 through 13 carbon atoms; (subsituted cycloalkyl) alkyl of 4 through 14 carbon atoms wherein said substituent is selected from the group consisting of bromine, chlorine, methoxy and alkyl; and (substituted cycloalkenyl)alkyl of 5 through 14 carbon atoms wherein said substituent is selected from the group consisting of bromine, chlorine, methoxy, and alkyl;

$R_2$ is selected from the group consisting of hydrogen, chlorine and bromine; and $R_3$ is methyl; with the proviso that $R_2$ and $R_3$ can be joined together to form —$(CH_2)_n$— where $n$ is a positive whole number from 3 through 5; and with the further proviso that when $R_2$ is hydrogen, $R_1$ is other than methyl and ethyl; and acid salts of said compound.

5. 6-sec.-butylimino-5-chloro-3,6-dihydro-4-methyl-2H-1,3-oxazin-2-one hydrochloride.

6. 6-sec-butylimino-5-bromo-3,6-dihydro-4-methyl-2H-1,3-oxazin-2-one hydrobromide.

7. 6 - norbornylimino-3,6-dihydro-4-methyl-2H-1,3-oxazin-2-one hydrochloride.

8. 6-norbornylmethylimino - 5 - bromo-3,6-dihydro-4-methyl-2H-1,3-oxazin-2-one hydrobromide.

9. 6-(1-ethylpropylimino)-5-bromo - 3,6 - dihydro-4-methyl-2H-1,3-oxazin-2-one hydrobromide.

10. 6-(1,3 - dimethylbutylimino)-5-chloro-3,6-dihydro-4-methyl-2H-1,3-oxazin-2-one hydrochloride.

11. 6-isopropylimino - 5 - bromo-3,6-dihydro-4-methyl-2H-1,3-oxazin-2-one hydrobromide.

12. 6-tert. - butylimino-5-bromo-3,6-dihydro-4-methyl-2H-1,3-oxazin-2-one hydrobromide.

13. 6 - phenylimino-5-bromo-3,6-dihydro-4-methyl-2H-1,3-oxazin-2-one hydrobromide.

14. 6-(3a,4,7,7a-tetrahydro - 4,7 - methanoindan-2-ylimino)-3,6-dihydro-4-methyl-2H-1,3-oxazin-2-one hydrochloride.

15. 6 - cyclohexylimino-5-bromo-3,6-dihydro-4-methyl-2H-1,3-oxazin-2-one hydrobromide.

16. 6-cyclohexylimino - 4,5 - trimethylene-3,6-dihydro-2H-1,3-oxazin-2-one hydrochloride.

17. 6-tert.-butylimino - 5 - chloro-3,6-dihydro-4-methyl-1,3-oxazin-2-one hydrochloride.

18. The process of making an oxazinone compound of the formula

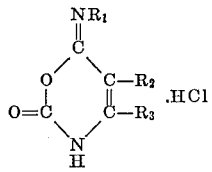

where
$R_1$ is selected from the group consisting of hydrogen; alkyl of 1 through 10 carbons; substituted alkyl of 1 through 8 carbons, wherein said substituent is selected from the group consisting of bromine, chlorine, hydroxy, alkoxy of 1 through 7 carbon atoms, alkoxy carbonyl of 2 through 7 carbon atoms, and cyano; aryl selected from the group consisting of phenyl, naphthyl, biphenylyl, dialkylphenyl of 8 through 12 carbon atoms, tetrahydronaphthyl and indenyl; substituted phenyl wherein said substituent is selected from the group consisting of chlorine, bromine, fluorine, nitro, alkoxy of 1 through 4 carbon atoms, alkyl of one through 5 carbon atoms, trifluoromethyl, 1,2-tetramethylene, and 1,2-trimethylene; aralkyl selected from the group consisting of furfuryl, benzyl, phenylalkyl of 8 through 11 carbon atoms and naphthylmethyl; substituted aralkyl of 5 through 13 carbon atoms wherein said substituent is selected from the group consisting of chlorine, nitro, alkyl of 1 through 4 carbon atoms and methoxy; alkenyl of 3 through 8 carbon atoms; alkynyl of 3 through 8 carbon atoms; cycloalkyl of 3 through 12 carbon atoms; cycloalkenyl of 4 through 12 carbon atoms; cycloalkyl alkyl of 4 through 13 carbon atoms; cycloalkenylalkyl of 5 through 13 carbon atoms; substituted cycloalkyl of 3 through 12 carbon atoms wherein said substituent is selected from the group consisting of bromine, fluorine, methoxy and alkyl of 1 through 4 carbon atoms; substituted cycloalkenyl of 4 through 12 carbon atoms wherein said substituent is selected from the group consisting of bromine, chlorine, methoxy and alkyl of 1 through 4 carbon atoms; (substituted cycloalkyl)alkyl of 4 through 14 carbon atoms wherein said substituent is selected from the group consisting of bromine, chlorine, methoxy and alkyl of 1 through 4 carbon atoms;

$R_2$ is selected from the group consisting of hydrogen, chlorine, bromine, methyl, ethyl, n-propyl, isopropyl, n-butyl, sec-butyl, tert.-butyl, methoxy, ethoxy, n-propoxy, isopropoxy, n-butoxy, sec-butoxy and tert.-butoxy; and $R_3$ is selected from the group consisting of alkyl of 1 through 4 carbons, chloroalkyl of 1 through 4 carbons and bromoalkyl of 1 through 4 carbons; with the proviso that $R_2$ and $R_3$ can be joined together to form $-(CH_2)_n-$ where $n$ is a positive whole number from 3 through 5;

said process comprising the steps of
(1) reacting a substituted acetoacetamide of the formula:

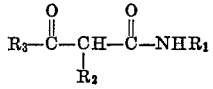

with ammonia to form a substituted beta-aminocrotonamide of the formula:

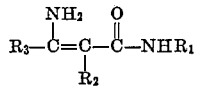

where $R_1$, $R_2$ and $R_3$ have the same meaning as before; and
(2) reacting said beta-aminocrotonamide with phosgene to form said oxazinone compound.

19. The process of preparting an oxazinone compound of the formula:

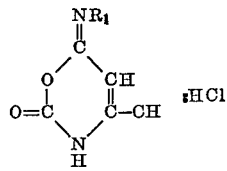

where
$R_1$ is selected from the group consisting of hydrogen; alkyl of 1 through 10 carbon atoms; substituted alkyl of 1 through 8 carbon atoms wherein said substituent is selected from the group consisting of bromine, chlorine, hydroxy, alkoxy of 1 through 7 carbon atoms, alkoxy carbonyl of 2 through 7 carbon atoms and cyano; aryl selected from the group consisting of phenyl, naphthyl, biphenyl, dialkylphenyl of 8 through 12 carbon atoms, tetrahydronaphthyl and indenyl; substituted phenyl wherein said substituent is selected from the group consisting of chlorine, bromine, fluorine, nitro, alkoxy of 1 through 4 carbon atoms, alkyl of 1 through 5 carbon atoms, trifluoromethyl, 1,2-tetramethylene and 1,2-trimethylene; aralkyl selected from the group consisting of furfuryl, benzyl, phenylalkyl of 8 through 11 carbon atoms and naphthylmethyl; substituted aralkyl of 5 through 13 carbon atoms wherein said substituent is selected from the group consisting of chlorine, nitro, alkyl of 1 through 4 carbon atoms and methoxy; alkenyl of 3 through 8 carbon atoms; alkynyl of 3 through 8 carbon atoms; cycloalkyl of 3 through 12 carbon atoms; cycloalkenyl of 4 through 12 carbon atoms; cycloalkylalkyl of 4 through 13 carbon atoms; cycloalkenyl allyl of 5 through 13 carbon atoms; substituted cycloalkyl of 3 through 12 carbon atoms wherein said substituent is selected from the group consisting of bromine, fluorine, methoxy and alkyl of one through 4 carbon atoms; substituted cycloalkenyl of 4 through 12 carbon atoms wherein said substituent is selected from the group consisting of bromine, chlorine, methoxy and alkyl of 1 through 4 carbon atoms; (substituted cycloalkyl)alkyl of 4 through 14 carbon atoms wherein said substituent is selected from the group consisting of bromine, chlorine, methoxy and alkyl of 1 through 4 carbon atoms;

said process comprising the steps of
(1) reacting an acetoacetamide of the formula:

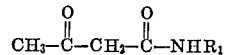

with ammonia to form a beta-aminocrotonamide of the formula:

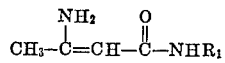

where $R_1$ has the same meaning as before; and
(2) reacting said beta-aminocrotonamide with phosgene to form said oxazinone compound.

20. The process of preparing an oxazinone compound of the formula:

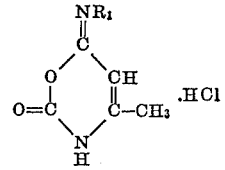

where
$R_1$ is selected from the group consisting of hydrogen; alkyl of 1 through 10 carbon atoms; substituted alkyl of 1 through 8 carbon atoms wherein said substituent is selected from the group consisting of bromine, chlorine, hydroxy, alkoxy of 1 through 7 carbon atoms, alkoxy carbonyl of 2 through 7 carbon atoms and cyano; aryl selected from the group consisting of phenyl, naphthyl, biphenlyl, dialkylphenyl of 8 through 12 carbon atoms, tetrahydronaphthyl and indenyl; substituted phenyl wherein said substituent is selected from the group consisting of chlorine, bromine, fluorine, nitro, alkoxy of 1 through 4 carbon atoms, alkyl of 1 through 5 carbon atoms, trifluoromethyl, 1,2-tetramethylene and 1,2-trimethylene; aralkyl selected from the group consisting of furfuryl, benzyl, phenylalkyl of 8 through 11 carbon atoms and naphthylmethyl; substituted aralkyl of 5 through 13 carbon atoms wherein said substituent is selected from the group consisting of chlorine, nitro, alkyl of 1 through 4 carbon atoms and methoxy; alkenyl of 3 through 8 carbon atoms; alkynyl of 3 through 8 carbon atoms; cycloalkyl of 3 through 12 carbon atoms; cycloalkenyl of 4 through 12 carbon atoms; cycloalkylalkyl of 4 through 13 carbon atoms; cycloalkenyl alkyl of 5 through 13 carbon atoms; substituted cycloalkyl of 3 through 12 carbon atoms wherein said substituent is selected from the group consisting of bromine, fluorine, methoxy and alkyl of one through 4 carbon atoms; substituted cycloalkenyl of 4 through 12 carbon atoms wherein said substituent is selected from the group consisting of bromine, chlorine, methoxy and alkyl of 1 through 4 carbon atoms; (substituted cycloalkyl)alkyl of 4 through 14 carbon atoms wherein said substituent is selected from the group consisting of bromine, chlorine, methoxy and alkyl of 1 through 4 carbon atoms;

said process comprising the steps of (1) reacting diketene with an amine of the formula $NH_2R_1$ to form a beta-aminocrotonamide of the formula:

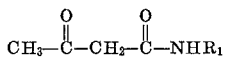

where $R_1$ has the same meaning as before;

(2) reacting said acetacetamide with ammonia to form a beta-aminocrotonamide of the formula:

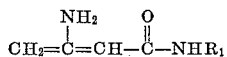

where $R_1$ has the same meaning as before; and (3) reacting said beta-aminocrotonamide with phosgene to form said oxazinone compound.

21. The process of preparing a halogenated oxazinone compound of the formula:

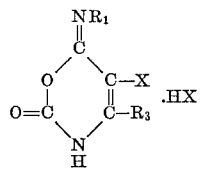

where $R_1$ is selected from the group consisting of hydrogen; alkyl of 1 through 10 carbon atoms; substituted alkyl of 1 through 8 carbon atoms wherein said substituent is selected from the group consisting of bromine, chlorine, hydroxy, alkoxy of 1 through 7 carbon atoms, alkoxy carbonyl of 2 through 7 carbon atoms and cyano; aryl selected from group consisting of phenyl, naphthyl, biphenylyl, dialkylphenyl of 8 through 12 carbon atoms, tetrahydronaphthyl and indenyl; substituted phenyl wherein said substituent is selected from the group consisting of chlorine, bromine, fluorine, nitro, alkoxy of 1 through 4 carbon atoms, alkyl of 1 through 5 carbon atoms, trifluoromethyl, 1,2-tetramethylene and 1,2-trimethylene; aralkyl selected from the group consisting of furfuryl, benzyl, phenylalkyl of 8 through 11 carbon atoms and naphthylmethyl; substituted aralkyl of 5 through 13 carbon atoms wherein said substituent is selected from the group consisting of chlorine, nitro, alkyl of 1 through 4 carbon atoms and methoxy; alkenyl of 3 through 8 carbon atoms; alkynyl of 3 through 8 carbon atoms; cycloalkyl of 3 through 12 carbon atoms; cycloalkenyl of 4 through 12 carbon atoms; cycloalkylalkyl of 4 through 13 carbon atoms; cycloalkenyl alkyl of 5 through 13 carbon atoms; substituted cycloalkyl of 3 through 12 carbon atoms wherein said substituent is selected from the group consisting of bromine, fluorine, methoxy and alkyl of one through 4 carbon atoms; substituted cycloalkenyl of 4 through 12 carbon atoms wherein said substitutent is selected from the group consisting of bromine, chlorine, methoxy and alkyl of 1 through 4 carbon atoms; (substituted cycloalkyl)alkyl of 4 through 14 carbon atoms wherein said substituent is selected from the group consisting of bromine, chlorine, methoxy and alkyl of 1 through 4 carbon atoms; $R_3$ is selected from the group consisting of alkyl of 1 through 4 carbons, chloroalkyl of 1 through 4 carbons, bromoalkyl of 1 through 4 carbons; and X is a halogen atom;

said process comprising reacting a halogenating agent under halogenation conditions with an oxazinone compound of the formula:

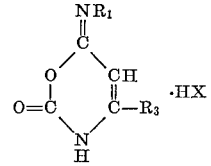

where $R_1$ and $R_3$ have the same meaning as above.

References Cited

UNITED STATES PATENTS

| | | | |
|---|---|---|---|
| 2,758,994 | 8/1956 | Lacey | 260—244 |
| 2,797,217 | 6/1957 | Safir et al. | 260—244 |

HENRY R. JILES, *Primary Examiner.*

R. T. BOND, *Assistant Examiner.*

U.S. Cl. X.R.

260—260